US012809639B2

(12) United States Patent
Singh et al.

(10) Patent No.: US 12,809,639 B2
(45) Date of Patent: Nov. 24, 2026

(54) DYNAMIC DEPLOYMENT AND RETIREMENT OF AN ON-DEMAND ROOT FILE SYSTEM AS-A-SERVICE

(71) Applicant: DELL PRODUCTS L.P., Round Rock, TX (US)

(72) Inventors: Ankit Singh, Bangalore (IN); Shrikant Hallur, Bangalore (IN); Naveen Awasthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 322 days.

(21) Appl. No.: 18/490,120

(22) Filed: Oct. 19, 2023

(65) Prior Publication Data

US 2025/0130814 A1 Apr. 24, 2025

(51) Int. Cl.
*G06F 9/4401* (2018.01)

(52) U.S. Cl.
CPC .................................. *G06F 9/4406* (2013.01)

(58) Field of Classification Search
None
See application file for complete search history.

(56) References Cited

U.S. PATENT DOCUMENTS

| | | | | |
|---|---|---|---|---|
| 9,804,855 | B1 * | 10/2017 | Paningipalli | G06F 9/4406 |
| 2016/0274896 | A1 * | 9/2016 | Bowen | G06F 9/45558 |
| 2019/0012483 | A1 * | 1/2019 | Thompson | G06F 21/78 |
| 2020/0184078 | A1 * | 6/2020 | Hinrichs | H04L 9/3268 |
| 2022/0100525 | A1 * | 3/2022 | Calciu | G06F 9/3838 |
| 2022/0188468 | A1 * | 6/2022 | Luciani | G06F 12/1458 |
| 2023/0023766 | A1 * | 1/2023 | Yang | G06F 9/44505 |
| 2023/0224160 | A1 | 7/2023 | Sanders et al. | |
| 2023/0229511 | A1 | 7/2023 | Panikkar et al. | |

* cited by examiner

*Primary Examiner* — Paul Yen
(74) *Attorney, Agent, or Firm* — Larson Newman, LLP

(57) ABSTRACT

An information handling system includes a storage and a basic input/output system (BIOS). The BIOS load and boot the base root file system. The BIOS determine a requested capability for the information handling system. The BIOS download an external root file system for the requested capability. The BIOS overlay the external root file system on the base root file system. The BIOS determine a job associated with the requested capability is completed. Based on the job being completed, the BIOS delete the external root file system.

20 Claims, 4 Drawing Sheets

DYNAMIC DEPLOYMENT AND RETIREMENT OF AN ON-DEMAND ROOT FILE SYSTEM AS-A-SERVICE

FIELD OF THE DISCLOSURE

The present disclosure generally relates to information handling systems, and more particularly relates to dynamic deployment and retirement of an on-demand root file system as-a-service.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a basic input/output system (BIOS) that loads and boots a base root file system. The BIOS may determine a requested capability for the information handling system, and download an external root file system for the requested capability. The BIOS may overlay the external root file system on the base root file system, and determine a job associated with the requested capability is completed. Based on the job being completed, the BIOS may delete the external root file system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
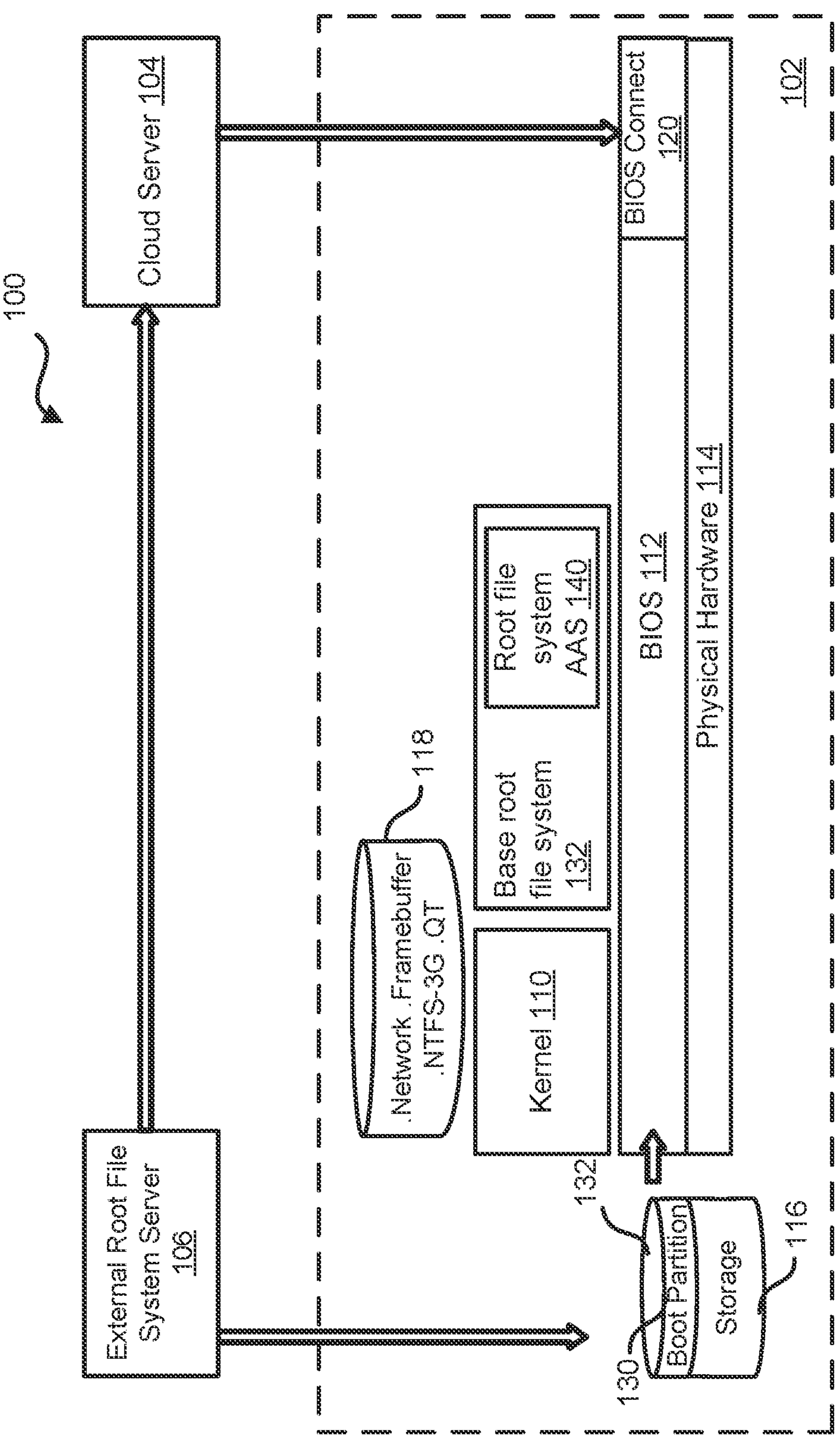
FIGS. 1 and 2 are block diagrams of a portion of a system according to at least one embodiment of the present disclosure.
Figure 2:
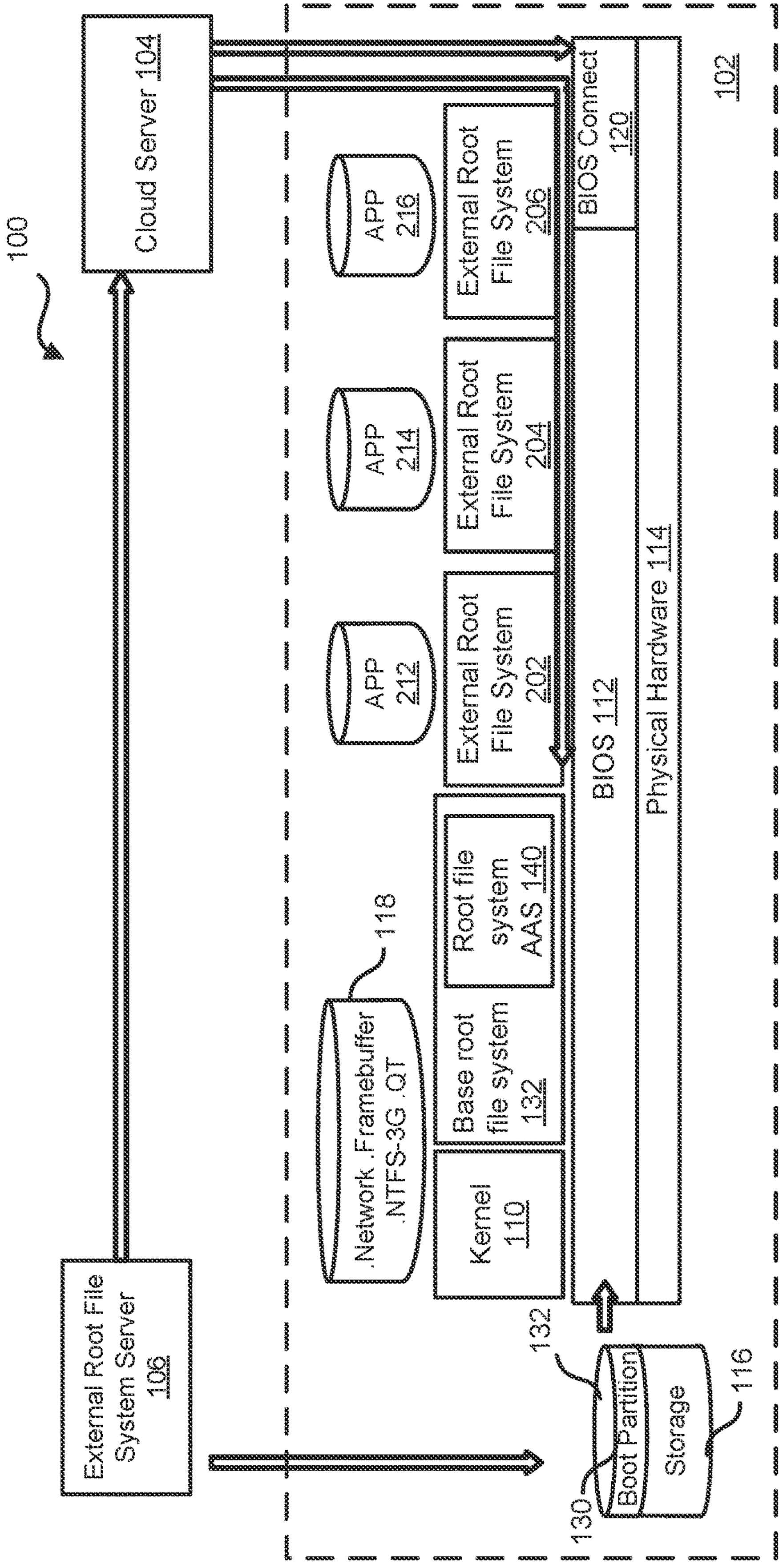

FIGS. 1 and 2 illustrate a portion of a system 100 including an information handling system 102, a cloud server 104, and an external root file system server 106 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 102 includes a kernel 110, basic input/output system (BIOS) 112, physical hardware components 114, a storage 116, and a stack 118. Information handling system 102 may communicate with cloud server 104 and external root file system server 106. BIOS 112 includes a BIOS connect 120, which may be utilized to communicate with cloud server 104. Storage 116 includes a secure boot partition 130, which may store a base root file system 132. In an example, base root file system 132 includes root file system as-a-service circuitry 140. Information handling system 102 may include additional components without varying from the scope of this disclosure.

Previous information handling systems may execute different features such as containers, cloud virtual machines, graphical diagnostics, or the like. However, execution of all of these capabilities on a single information handling system may consume a lot of resources, such as cache, memory, processing, and the like. Information handling system 102 may be improved by providing on-demand root rile system as-a-service, which may provide different root file systems at different times without over consuming the resources of the information handling system.

Information handling system 102 may include a bare-metal operating system (OS) to enable different services without any need for host OS to be installed. The bare-metal OS may include kernel 110 and base root file system 132 with support of stack 118. In an example, stack 118 may support WIFI, EFI framebuffer, network connection, or the like. In certain example, the bare-metal OS may not consume a large amount of storage 116. Base root file system 132 may also host root file system as-a-service circuitry 140, which may have capability to dynamically deploy and retire external root file systems without any reboot of information handling system 102.

In an example, the bare-metal OS and corresponding base root file system 132 may be stored within boot partition 130 of storage 116. In an example, storage 116 may be any suitable non-volatile memory including, but not limited to, a non-volatile memory express storage device. Secure boot partition 130 may be replay protected memory block (RPMB) protected, which may allow BIOS 112 to read and write to the boot partition in an authenticated process.

In certain examples, BIOS 112 may read secure boot partition 130 and determine whether the bare-metal OS and base root file system 132 is stored within the boot partition of storage 116. If the bare-metal OS and base root file system 132 are not located within secure boot partition 130, BIOS 112, via BIOS connect 120, may communicate with cloud server 104 to download the bare-metal OS and base root file system. In response to the bare-metal OS and base root file system 132 being downloaded, BIOS may store the bare-metal OS and base root file system in secure boot partition 130 and boot information handling system 102 in a bare-metal state based on the bare-metal OS and base root file system.

BIOS 112 may determine or receive an indication of a capability or service to be executed by information handling system 102. Based on the determination of the capability, BIOS 112 may execute root file system as-a-service circuitry 140 to communicate with external root file system server 106 and download the required external root file system for the capability. In certain examples, BIOS 112 may utilize root file system as-a-service circuitry 140 within base root file system 132 to perform the operations described herein. In an example, BIOS 112 may securely download the external root file system directly from external root file system server 106, from the external root file system via cloud server 104, or the like. In certain examples, the secure download may be via any suitable protocol, such as hypertext transfer protocol secure (HTTPS).

After the external root file system has been downloaded, BIOS 112 may verify the root file system via any suitable manner. For example, BIOS 112 may verify the signature of the download package for the external root file system. Based on the external root file system being verified, BIOS 112 may incorporate the root file system into base root file system 132 to add the associated capability to information handling system 102. In an example, BIOS 112 may overlay the external root file system on the base root file system so that the external root file system is executed instead of the base root file system as will be described with respect to FIG. 2.

Referring now to FIG. 2, BIOS 112, via root file system as-a-service circuitry 140, may download any one of multiple external root file systems 202, 204, and 206. The different external root file systems 202, 204, and 206 may be associated with a different application 212, 214, and 216. While multiple external root file systems 202, 204, and 206 and multiple corresponding applications 212, 214, and 216 are illustrated in FIG. 2, only a single external root file system and a single application may be utilized in information handling system 102 at one time so that a smaller amount of resources will be consumed within the information handling system.

In an example, BIOS 112 may detect a request for running a policy based virtual machine (VM) for a modern compute end point management. In this example, external root file system 202 may be a hypervisor root file system to execute a VM application 212. When VM job is completed, BIOS 112, via root file system as-a-service circuitry 140, may revert to base root file system 132. In an example, BIOS 112 may clear the hypervisor capability by removing external root file system 202 from the overlay of base root file system 132. In certain examples, the removal of root file system 202 may enable memory space and resources for any other capabilities to be added, such as a docker external root file system 204 with a diagnostic application 214, an X11 external root file system 206 with a graphical user interface (GUI) application 216, or the like. In an example, BIOS 112 does not need to reboot information handling system 102 when reverting to base root file system 132 because all the virtual file systems 202, 204, and 206 are overlayed on base root file system 132. In certain examples, BIOS 112 may dynamically add and remove root file systems 202, 204, and 206 as needed for different capabilities requested in information handling system 102.

Figure 3:
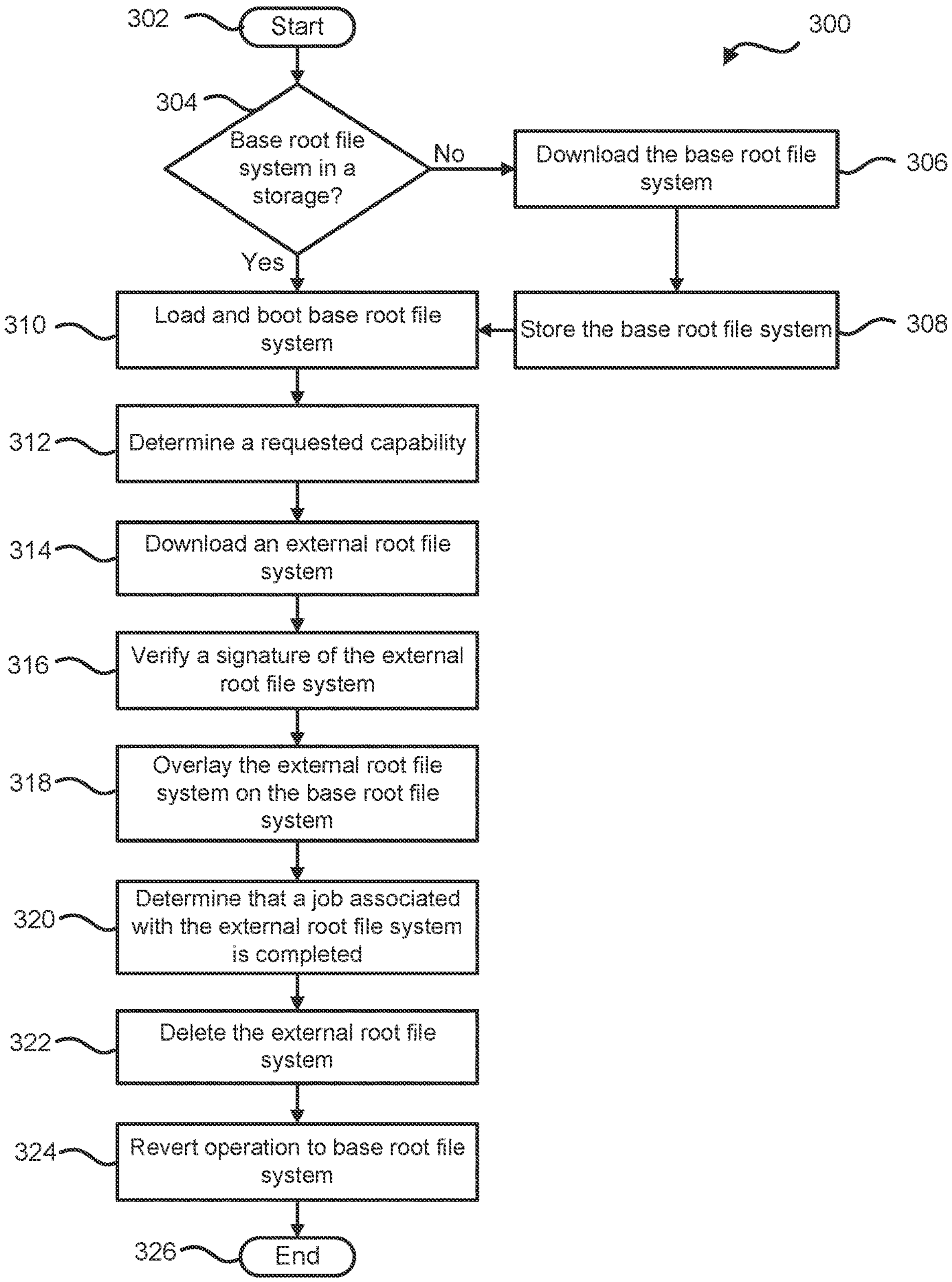
FIG. 3 is a flow diagram of a method for dynamically deploying and retiring on-demand root file systems as-a-service according to at least one embodiment of the present disclosure.

FIG. 3 is a flow diagram of a method 300 for dynamically deploying and retiring on-demand root file systems as-a-service according to at least one embodiment of the present disclosure, starting at block 302. In an example, method 300 may be performed by any suitable component including, but not limited to, BIOS 112 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 304, a determination is made whether a base root file system is stored in a storage of an information handling system. In an example, the base root file system may be located within or part of a base bare-metal operating system. The storage may be any suitable type of storage, such as a NVMe device, and the bare-metal operating system with the base root file system may be stored within a secure boot partition of the storage. If the base root file system is stored in the storage, the flow continues at block 310. If the base root file system is not stored in the storage, the base root file system is downloaded at block 306. In an example, the base root file system may be downloaded from a cloud server, and the cloud server may be managed/controlled by the same company as the information handling system. At block 308, the base root file system is stored in the storage.

At block 310, the base root file system is loaded and booted. In an example, the base root file system may be executed without a host OS being loaded and executed within the information handling system. At block 312, a requested capability for the information handling system is determined. In an example, the requested capability may include, but is not limited to, a virtual machine, a GUI application, and a diagnostic application.

At block 314, an external root file system for the requested capability is downloaded. In an example, the external root file system may be downloaded from an external root file system server via the cloud server. In an example, the external root file system is securely downloaded from the external server. At block 316, a signature of the external root file system is verified. At block 318, the external root file system is over-laid on the base root file system. At block 320, a job associated with the requested capability is completed is determined. At block 322, the external root file system is deleted. In an example, the external root file system is operated and deleted without the information handling system being rebooted. At block 324, the operation of a BIOS is reverted to the base root file system, and the flow ends at block 326.

Figure 4:
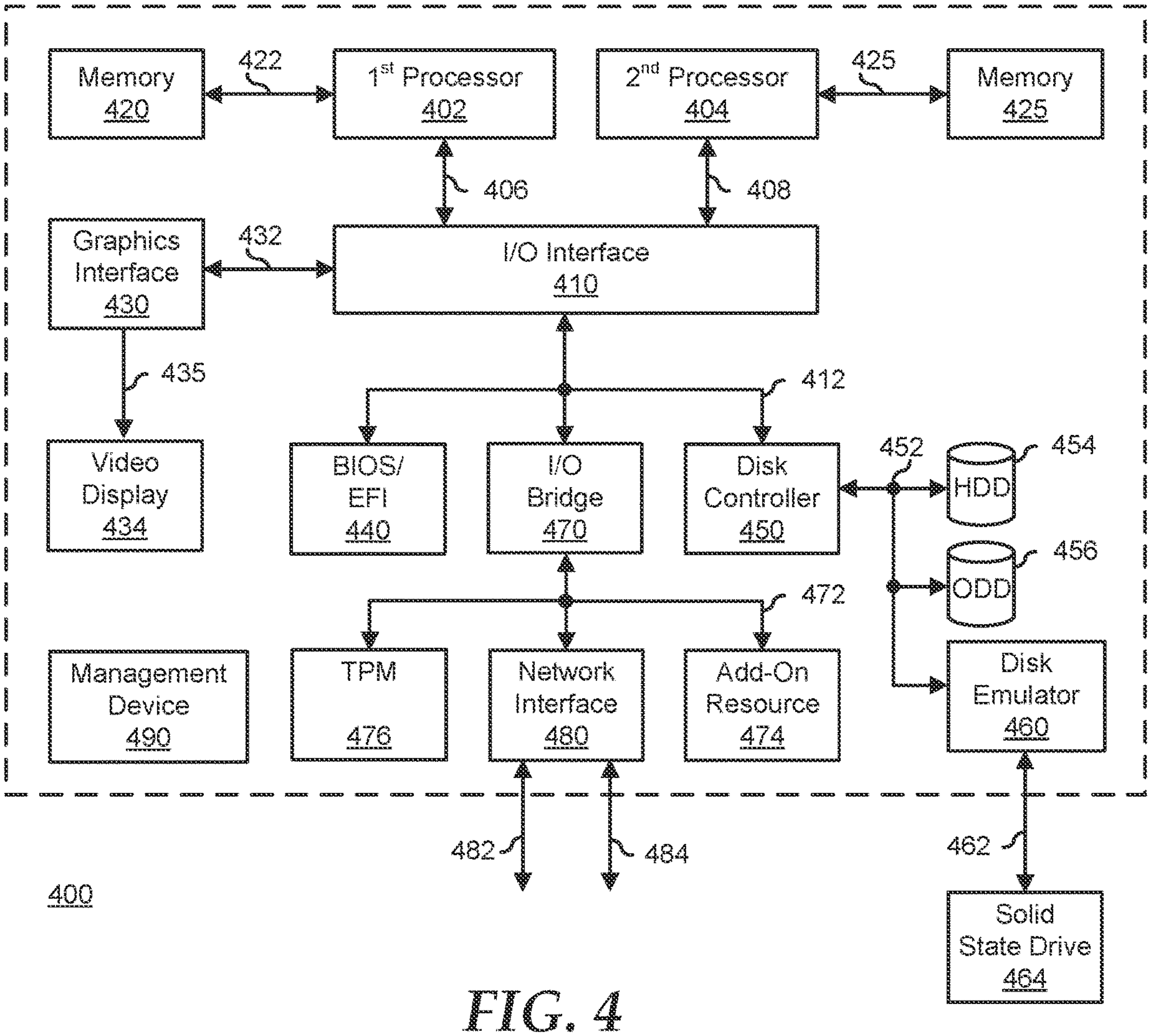
FIG. 4 is a block diagram of a general information handling system according to an embodiment of the present disclosure.

FIG. 4 shows a generalized embodiment of an information handling system 400 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
- a storage to store a base root file system; and
- a basic input/output system (BIOS) to communicate with the storage, the BIOS to:
  - load and boot the base root file system;
  - determine a requested capability for the information handling system;
  - download a download package for an external root file system for the requested capability;
  - verify a signature of the download package;
  - in response to the signature of the download package being verified, overlay the external root file system on the base root file system;
  - execute an application for a job associated with the requested capability, wherein only a single external root file system and a single application are stored within the information handling system at one time;
  - determine that the application for the job associated with the requested capability is completed; and
  - based on the job being completed, delete the external root file system.

2. The information handling system of claim 1, wherein in response to the external root file system being deleted, the BIOS further to: revert to operation of the base root file system.

3. The information handling system of claim 1, wherein prior to the base root file system being loaded and booted, the BIOS further to:
- determine that the base root file system is not stored in the storage;
- based on the base root file system not being stored in the storage, download the base root file system from a cloud server; and
- store the base root file system in the storage.

4. The information handling system of claim 1, wherein the external root file system is operated and deleted without the information handling system being rebooted.

5. The information handling system of claim 1, wherein the external root file system is securely downloaded from an external server.

6. The information handling system of claim 1, wherein prior to the external root file system being overlayed on the first root file system, the BIOS to: verify the external root file system.

7. The information handling system of claim 1, wherein the base root file system is part of a base bare metal operating system.

8. The information handling system of claim 7, wherein the base bare metal OS is stored in a protected boot partition of the storage.

9. A method comprising:
- loading and booting, by a basic input/output system (BIOS) of an information handling system, a base root file system;
- determining a requested capability for the information handling system;
- downloading a download package for an external root file system for the requested capability;

verifying a signature of the download package;

in response to the signature of the download package being verified, overlaying the external root file system on the base root file system;

executing an application for a job associated with the requested capability, wherein only a single external root file system and a single application are stored within the information handling system at one time;

determining the application for the job associated with the requested capability is completed; and based on the job being completed, deleting, by the BIOS, the external root file system.

10. The method of claim 9, wherein in response to the deleting of the external root file system, the method further comprising: reverting to operation of the base root file system.

11. The method of claim 9, wherein prior to the loading and booting of the base root file system, the method further comprising:

determining that the base root file system is not stored in the storage;

based on the base root file system not being stored in the storage, downloading the base root file system from a cloud server; and storing the base root file system in the storage.

12. The method of claim 9, wherein the external root file system is operated and deleted without the information handling system being rebooted.

13. The method of claim 9, wherein the external root file system is securely downloaded from an external server.

14. The method of claim 9, wherein prior to the external root file system being overlayed on the first root file system, the method further comprises: verifying the external root file system.

15. The method of claim 9, wherein the base root file system is part of a base bare metal operating system.

16. The method of claim 15, wherein the base bare metal OS is stored in a protected boot partition of the storage.

17. An information handling system comprising:

a storage to store a base root file system; and a basic input/output system (BIOS) to:

if the base root file system is not stored in the storage, then download the base root file system;

store the base root file system in the storage;

load and boot the base root file system;

determine a requested capability for the information handling system;

download a download package for an external root file system for the requested capability;

verify a signature of the download package;

in response to the signature of the download package being verified, overlay the external root file system on the base root file system;

execute an application for a job associated with the requested capability, wherein only a single external root file system and a single application are stored within the information handling system at one time;

if the application for the job associated with the requested capability is completed, then delete the external root file system, wherein the external root file system is operated and deleted without the information handling system being rebooted.

18. The information handling system of claim 17, wherein in response to the external root file system being deleted, the BIOS further to: revert to operation of the base root file system.

19. The information handling system of claim 18, wherein prior to the external root file system being overlayed on the first root file system, the BIOS to: verify the external root file system.

20. The information handling system of claim 18, wherein the base root file system is part of a base bare metal operating system.

* * * * *